US012160054B2

(12) United States Patent
Merrett et al.

(10) Patent No.: US 12,160,054 B2
(45) Date of Patent: Dec. 3, 2024

(54) RADIOFREQUENCY ANTENNA

(71) Applicant: Far Field Exploits Limited, Newton Abbot (GB)

(72) Inventors: Simon Merrett, Newton Abbot (GB); Christopher Dadd, Newton Abbot (GB); Simon Ballantyne, Newton Abbot (GB)

(73) Assignee: Far Field Exploits Limited, Newton Abbot (GB)

( * ) Notice: Subject to any disclaimer, the term of this patent is extended or adjusted under 35 U.S.C. 154(b) by 0 days.

(21) Appl. No.: 18/696,176

(22) PCT Filed: Oct. 4, 2023

(86) PCT No.: PCT/GB2023/052556
§ 371 (c)(1),
(2) Date: Mar. 27, 2024

(87) PCT Pub. No.: WO2024/074821
PCT Pub. Date: Apr. 11, 2024

(65) Prior Publication Data

US 2024/0266743 A1 Aug. 8, 2024

(30) Foreign Application Priority Data

Oct. 5, 2022 (GB) ..................................... 2214635

(51) Int. Cl.
*H01Q 21/06* (2006.01)
*H01Q 9/04* (2006.01)

(52) U.S. Cl.
CPC ................................ *H01Q 9/0407* (2013.01)

(58) Field of Classification Search
CPC ....... H01Q 1/38; H01Q 9/0407; H01Q 21/065
See application file for complete search history.

(56) References Cited

U.S. PATENT DOCUMENTS 10,756,446 B2 * 8/2020 Ahmadloo ............. H01Q 1/525
11,289,822 B2 * 3/2022 Goto .................... H01Q 9/0407
(Continued)

FOREIGN PATENT DOCUMENTS

EP 0487053 A1 5/1992
JP S5437663 A 3/1979

OTHER PUBLICATIONS

Wei, KP et al, "Design of a Dualband Omnidirectional Planar Microstrip Antenna Array," Progress in Electromagnetics, vol. 126, pp. 101-120, 2012.

(Continued)

*Primary Examiner* — Hasan Islam
(74) *Attorney, Agent, or Firm* — KDW Firm PLLC

(57) ABSTRACT

A radiofrequency collinear microstrip patch antenna includes an electrically insulating substrate longer along an axis than its width substantially perpendicular to the axis with two face portions, and an element of electrical conductor on each face portion, each including portions of narrower and wider width, a narrower width portion of one element on one face portion of the substrate substantially corresponding along the axis with a wider width portion of another element on another face portion of the substrate. One element wider width portion includes a zone of conductor across the wider width portion and a tapered region along the axis overlapping along the axis of the substrate with a narrower width portion of another element and forming an approximately concave end to the portion so the wider width portion is longer along the axis towards a side of the substrate than towards the axis, and the antenna can be driven from one end.

10 Claims, 7 Drawing Sheets

(56) References Cited

U.S. PATENT DOCUMENTS

| | | | | |
|---|---|---|---|---|
| 2007/0052593 | A1 | 3/2007 | Bateman | |
| 2007/0164906 | A1 | 7/2007 | Tsai | |
| 2009/0096677 | A1 | 4/2009 | Chang | |
| 2019/0074599 | A1* | 3/2019 | Yu | H01Q 21/0075 |
| 2022/0209398 | A1 | 6/2022 | Chiang | |
| 2023/0231320 | A1* | 7/2023 | Lou | H01Q 13/206<br>343/702 |

OTHER PUBLICATIONS

Bras, Luis et al., "Planar omnidirectional microstrip antenna array for 5 GHz ISM and UNII band," 2013 IEEE Antennas and Propagation Society International Symposium, Jul. 7, 2013, pp. 1590-1591.

International Search Report and Written Opinion for Application No. PCT/GB2023/052556 dated Jan. 25, 2024.

* cited by examiner

RADIOFREQUENCY ANTENNA

This application is a national stage filing under 35 U.S.C. 371 of pending International Application No. PCT/GB2023/052556, filed Oct. 4, 2023, which claims priority to GB Patent Application No. 2214635.1, filed Oct. 5, 2022, the entireties of which applications are incorporated by reference herein.

FIELD OF THE INVENTION

The present inventive concept relates to the field of radiofrequency antennas, especially to collinear microstrip patch antennas. In general, patch antennas have antenna elements disposed as a relatively thin layer of conductor material onto another material.

BACKGROUND TO THE INVENTION

Alois Holub and Milan Polívka—Collinear Microstrip Patch Antennas—sets out some of the context and background to the present invention in this field of collinear microstrip patch antennas.

In that paper, a particular prior art arrangement as proposed by Bateman and Bancroft is referred to, which is also disclosed in US-A-2007/0052593.

K. P. Wei, Z. J. Zhang, and Z. H. Feng—Design Of A Dualband Omnidirectional Planar Microstrip Antenna Array—*Progress In Electromagnetics Research*, Vol. 126, 101-120, 2012—is believed to be the closest prior art. The disclosure suggests a dualband planar microstrip array (see FIG. 13, for example) having alternating rectangular microstrips and ground planes.

US-A-2009/0096677 of Tatung Company is also of background interest: it discloses a dual band radiofrequency antenna in which a signal line and ground part are etched on opposite faces of a substrate. However, the arrangement does not provide an antenna as set out in the present inventive concept.

US-A-2007/164906 of Tsai and US-A-2022/09398 of Chiang were cited with reference to our co-pending UK patent application and are referred to now for completeness.

The present inventive concept provides improvements to radiofrequency antenna performance, especially in the field of collinear microstrip patch antennas.

SUMMARY OF INVENTION

The present inventive concept provides a radiofrequency collinear microstrip patch antenna adapted to be driven by an external source, the antenna comprising a substantially electrically insulating substrate being longer along an axis than its width substantially perpendicular to the axis, the substrate having at least two face portions in different geometric planes, the antenna comprising at least one element of electrical conductor arranged on each of the at least two face portions of the substrate along an axis of the substrate, each element comprising one or more portions of relatively narrower width and one or more portions of relatively wider width, each portion being approximately the same length as one another, wherein at least one portion of relatively narrower width of one element on one face portion of the substrate substantially corresponds along the axis of the substrate with at least one portion of relatively wider width of another element on another face portion of the substrate, and wherein at least one portion of relatively wider width of one element comprises a zone of conductor which is substantially contiguous across the width of the portion of relatively wider width and at least one tapered region along the axis, the tapered region overlapping along the axis of the said substrate with at least one portion of relatively narrower width of another element, and wherein the or each tapered region forms an approximately concave end to the portion such that the portion of relatively wider width is longer along the axis towards a side of the substrate than towards the axis of the substrate, and wherein the antenna is adapted to be driven from one end thereof only.

Each element has an electrical conductor having more than one portion electrically connected to one another. The elements on each face of the substrate are ideally not directly electrically connected together; i.e. in general the only connection therebetween would be via a driver. In previous arrangements, the wider portions are sometimes referred to as patches or ground planes according to function and the narrower portions are sometimes referred to as microstrips. In the present arrangement the wider portions can perform a dual ground plane and patch function.

The present arrangement sees the respective portions of each element encroaching into a region that would normally not be overlapped in previous arrangements. This arrangement increases the effective length of antenna elements, which lowers the resonant frequency of the antenna, without increasing the total length of the antenna itself. In the tapered (encroaching/overlapping areas) the microstrip impedance varies significantly, thereby changing the velocity factor of these portions and, when driven by a radiofrequency signal, changing the performance of the antenna compared with previous arrangements. These dispersed reactive sections along the antenna contribute to the longer electrical length and wider bandwidth of the antenna. This can provide for an antenna with a significantly higher fractional bandwidth than known antennas.

The encroachment can be described as overlap of a portion of relatively wider width on one face and a portion of relatively narrower width of another face or as an overlap of two portions of relatively wider widths on different faces of the substrate.

On one or each face of the substrate, a further encroachment can be described where a portion or relatively narrower width extends into the tapered region of the adjacent portion of relatively wider width.

There are two key contrasts between the arrangement of the present invention and, for example, the disclosure of US-A-2007/0052593 (Bateman and Bancroft). Firstly, the concave tapered end region provides for the encroachment described above. Secondly, the antenna is driven at one end only. Both of these differences provide for different electric field effects and in combination provide for much improved performance.

The disclosure by Wei, Zhang, and Feng, referring to FIG. 13 for example, proposes alternating microstrips and ground planes on both faces of a substrate, with the antenna being driven at one end only. However, the concave tapered end region is not disclosed, and thus no encroachment as described above is disclosed.

It appears that the performance of antennas of this type, i.e. collinear microstrip patch antennas is greatly affected by the size and nature of gaps between respective parts of the conductors, i.e. where electric fields are interacting across an insulating region. Thus the interaction between a portion of wider width on one face of the substrate and a portion of narrow width on the other face of the substrate is changed significantly from the Wei, Zhang, and Feng arrangement by the addition of the concave tapered end region of the portion of wider width.

The zone of conductor which is substantially contiguous across the width of the portion may be substantially symmetrical at at least one point or distance along and with respect to the axis of the substrate. In other words, the said zone of conductor may be substantially contiguous and rectangular with edges thereof substantially parallel to the axis of the substrate. The portion of relatively wider width may fill substantially the whole width of the substrate, perpendicular to the axis.

The portion of relatively wider may be filled with the conductor across its width except where the concave tapered end region is absent conductor.

A plurality of portions of relatively wider width may comprise a zone of conductor which is substantially contiguous across the width thereof. All portions of relatively wider width may comprise a zone of conductor which is substantially contiguous across the width thereof.

Each portion of relatively narrower width can have a corresponding portion of relatively wider width on another face of the substrate.

For the avoidance of doubt, the width mentioned is intended to refer to displacement away from the axis—in other words substantially perpendicular thereto and within the plane of the substrate.

Each element portion can be said to have two ends, with a central region therebetween. A tapered region may comprise a V or chevron shape conductor boundary. A said V or chevron shape boundary may be located at substantially one or both ends of the said portion of conductor and is arranged so that a vertex thereof is within the portion—rather than at the respective end of the portion; in other words the V or chevron shape "points" towards the centre of the portion. The said vertex may be located substantially on the axis of the substrate. An or each element portion may be substantially symmetrical along the axis of the substrate.

The tapered region may have two tapered elements, one on either side of the axis of the substrate. Each such tapered element could be described as having a sub-axis along a line equidistant from each edge of the tapered element. Thus, as the tapered element of conductor encroaches into the region where it overlaps with the relatively narrower width portion on the other face of the substrate, it may decrease in width. The decrease may be consistent, to form the "V" or chevron shape boundary as described.

A portion of relatively wider width may be symmetrical across a median point between either end of the portion. In some embodiments, all of the portions of relatively wider width may be symmetrical across a median point between either end of the portion except for the portions at either end of the substrate.

Optionally, the conductor as a whole on one or each face of the substrate may be symmetrical across a median point approximately halfway along the axis of the substrate.

A portion of relatively wider width having tapered portions at both ends thereof might be alternatively described as being an irregular hexagon, for example a concave hexagonal shape or an hourglass hexagon shape.

All of the tapered portions may comprise or be V or chevron shaped.

The said tapered region may have other similar forms which do not have strictly V or chevron shaped boundaries. There are a range of variables, including a range of suitable lengths and suitable angles of taper, and the degree of overlap of the respective portions. Furthermore, it is envisaged that multi-edged or curved tapers could be advantageous.

However it is notable that the said tapered region arrangement works significantly better than a rectangular end arrangement. This is discussed below with reference to FIGS. 3 and 4. In other words, the arrangement as described works significantly better than in an alternative arrangement which does not fall within the scope of the present application where the portions of relatively wider width could be rectangular and longer than the portions of relatively narrower width such that there is an overlap between the wider portion of one element on one face and the wider portion of an adjacent element on a second face.

For each element, the portions of relatively narrower width and relatively wider width can alternate along the axis.

Preferably, the antenna is driven from one end thereof only. In other words, the elements are preferably each connected to a drive arrangement at the same one end thereof only. A suitable drive arrangement may be a coaxial cable. For example the first element of an antenna may be connected to an outer shield of a coaxial cable and the second element to the inner conductor of the coaxial cable.

The element on a particular face portion of the substrate need not extend along the whole length of the substrate. For example, where one face portion has a portion of relatively wider width at an end of the substrate away from a drive arrangement, on another face of the substrate there need not be a portion of relatively narrower width. In other words, towards a non-driven end of the antenna there need not be a portion of relatively narrower width.

Preferably an element on at least one face of the substrate has an odd number of portions. This can provide for better performance than for an antenna in which each element has an even number of portions.

Preferably, an element on at least one face of the substrate each element has an odd number of at least three portions. Each element on at least one face of the substrate can have five portions. Each element on at least one face of the substrate can have nine portions. Very good antenna performance has been observed using three, five or nine portions on at least one face of the substrate.

An exemplary antenna may have two face portions with the element on a first face portion of the substrate having two portions and the element on a second face portion having three portions; the first face portion has one portion of relatively narrower width and one portion of relatively wider width and a second face portion having two portions of relatively wider width and one portion of relatively narrower width—wherein the portion of relatively wider width on the first face portion corresponds along the axis of the substrate with the portion of relatively narrower width on the second face portion. Such an exemplary antenna has been found to have good performance in practice. There have also been good antennas produced with four portions on the first face portion and five portions on the second face portion, and with eight portions on the first face portion and nine portions on the second face portion.

An exemplary embodiment of an antenna with the configuration described above having good performance between approximately 230 MHz and approximately 430 MHz has two portions on a first face portion and three portions on a second face portion, the antenna being approximately 500 mm long in total. The width of the relatively wider portions is approximately 20 mm. The distance which the tapered/chevron/'V' tips extend along the narrower portion is approximately 18 mm and the overlap distance between the tapered/chevron/'V' tips of a relatively wider portion on one face and a relatively wider portion on another face is approximately 15 mm. The substrate thickness is approximately 0.6 mm and relatively narrower portion width is approximately 1.2 mm.

The electrical conduction should be of material having good electrical conduction properties, such as copper The substrate is ideally nominally classed as an electrical insulator with a dielectric constant in the region of 3 to 8 and low loss tangent.

In one embodiment, an antenna has a first element on a first face of the substrate, the first element has one portion of relatively narrower width, at substantially the driven/fed end of the element, and one portion of relatively wider width centred approximately halfway along the axis of the substrate; the one portion of relatively wider width has a tapered region and both ends thereof, the tapered regions being V shaped, with the vertices of the tapered regions being within the portion of relatively wider width, so that the V or chevron shape "points" towards a centre of the portion; the antenna has a second element on a second opposite face of the substrate which has two portions of relatively wider width, one at substantially each end of the element, and one portion of relatively narrower width in between the portions of relatively wider width; at the ends of the portions of relatively wider width which are located at respective ends of the second element the ends of the portions are rectangular, and at the respective other ends of the portions—i.e. those closest centrally along the axis of the substrate—the portions of relatively wider width are tapered with a V shape, with the vertices of the tapered regions being within the portion of relatively wider width, so that the V or chevron shape "points" towards a centre of the portion. Thus, the portion of relatively wider width of the first element is aligned along the axis of the substrate with the portion of relatively narrower width of the second element and the portion of relatively wider width of the second element at substantially the driven/fed end being aligned along the axis with the portion of relatively narrower width of the first element and with the first and second elements being on respective faces of the substrate with the substrate being in between the elements. The tapered regions as described provide overlaps in which parts of the portions of relatively wider width "encroach" into the space occupied by the corresponding portions of relatively narrower width (where present) of the other element. In this embodiment tapered regions of the portion of relatively wider width of the first element also overlap with a tapered region of each of the portions of relatively wider width of the second element. A further encroachment arises where a portion or relatively narrower width extends into the tapered region of the adjacent portion of relatively wider width of the same element—i.e. on the same face of the substrate.

In such an arrangement, for each element the respective portions thereof are connected electrically in series with one another along the axis of the substrate.

Each element may be adapted to be driven by a signal at one point only. Each element may be adapted to be driven by a signal at substantially one end only thereof. Preferably both of the elements are driven by a signal at the same one end thereof. Thus, the antenna is preferably driven from substantially a single end thereof. Thus, preferably there is no direct electrical connection between the elements.

Preferably, the width of the relatively narrow portions is selected for the specific thickness of the substrate and its dielectric constant, to provide a nominal transmission line feature.

BRIEF DESCRIPTION OF THE DRAWINGS

The present inventive concept will now be described further with reference to the accompanying drawings, in which:

FIG. 1 comprising

DETAILED DESCRIPTION OF THE INVENTION

Turning to FIG. 1, an antenna 10 comprises an elongate substrate 12 of electrical insulator which has an axis X running approximately centrally to the substrate along its length.

Figure 1A:
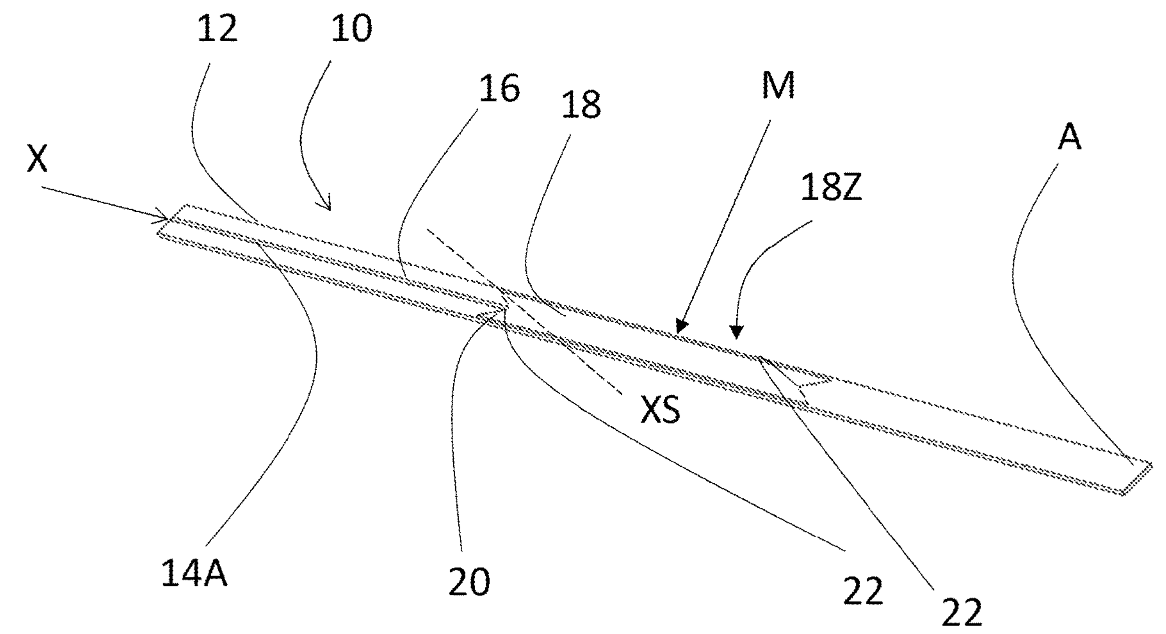
FIGS. 1A and 1B shows a perspective schematic view of an exemplary embodiment of an antenna of the present inventive concept, with FIG. 1A showing a first face and FIG. 1B showing a second face.

As shown in FIG. 1A, a first element 14A of electrical conductor is arranged on a first face A of the substrate 12. The element 14A has one portion 16 of relatively narrower width located at substantially one end of the substrate 12 (where the antenna would be driven or fed) and a portion 18 of relatively wider width located substantially centrally along the length of the substrate 12, adjacent the portion 16 of relatively narrower width. The portions of relatively narrower width 16 and portion of relatively wider width 18 thus alternate along the axis X and along the length of the substrate 12.

The portion of relatively wider width 18 has a zone 18Z of conductor which is substantially contiguous across the width of the portion 18, being substantially symmetrical at at least one point or distance along and with respect to the axis X of the substrate. In other words, there is a zone 18Z of conductor which is substantially contiguous and rectangular with edges thereof substantially parallel to the axis X. The portion of relatively wider width 18 in this example fills substantially the whole width of the substrate, perpendicular to the axis X.

In this example, at both ends of the portion of relatively wider width 18 there are tapered regions 20 which have a V or chevron shape conductor boundary, with the vertices 22 of the tapered regions 20 being within the portion 18 so that the V or chevron shape "points" towards the centre of the portion 18. The vertices 22 are located on the axis X, and the portion of relatively wider width 18 is substantially symmetrical along the axis X. Perpendicular to the axis X the conductor decreases in coverage across the width of the portion of relatively wider width 18, in the direction of the axis X from the zone 18Z and the respective end of the portion 18. The tapered region 20 can be described as having two tapered elements, one on either side of the axis X. Each tapered element can be described as having a sub-axis XS (only one is labelled to aid clarity) along a line equidistant from each edge of the tapered element. Thus, as the tapered element of conductor encroaches into the region where it overlaps with the relatively narrower width portion on the other face of the substrate, it decreases in width. In this example the decrease is consistent, to form the "V" or chevron shape boundary as described. In this example, the tapered element is substantially symmetric along the sub-axis XS thereof.

The portion of relatively narrower width 16 extends from the tapered region 20.

Figure 1B:
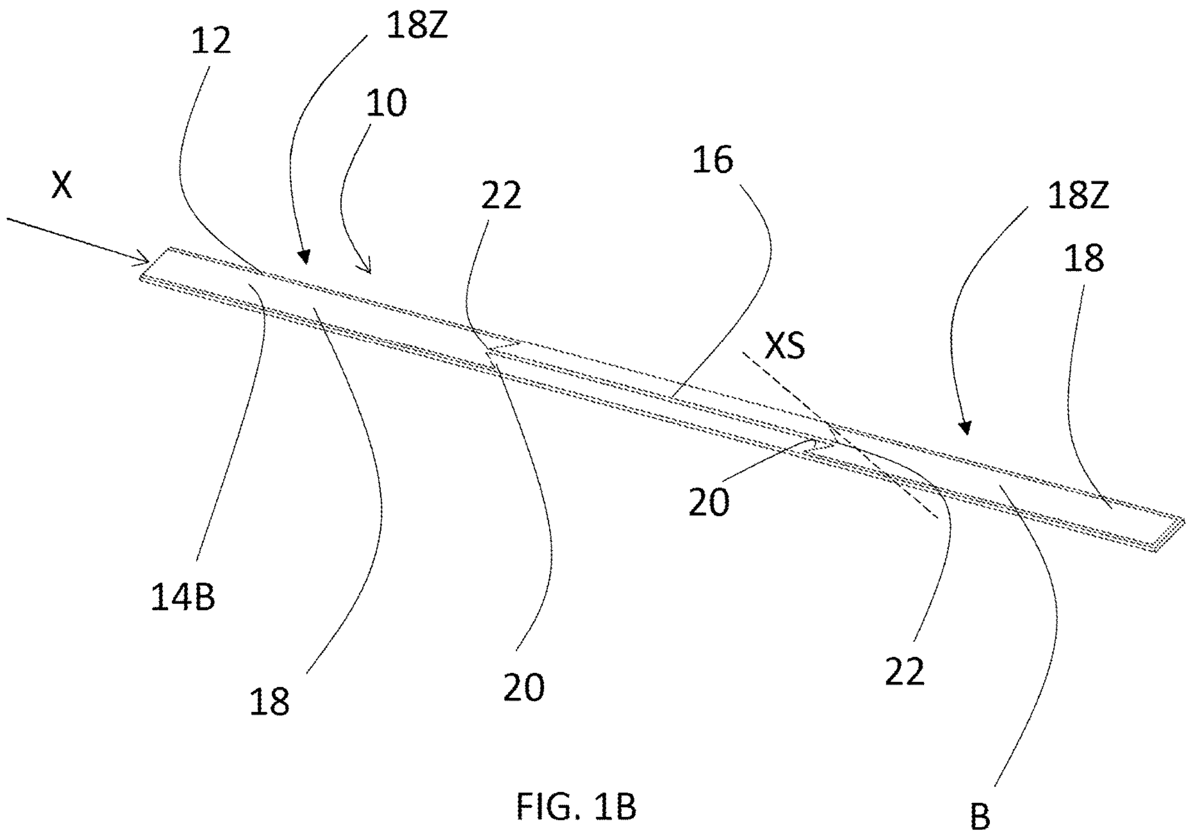

As shown in FIG. 1B, a second element 14B is arranged on a second face B of the substrate 12. The element 14B has a portion 16 of relatively narrower width located substantially centrally along the length of the substrate 12 in between portions of relatively wider width 18 which are located at substantially either end of the substrate 12. The portions of relatively wider width 18 and portion of relatively narrower width 16 thus alternate along the axis X and along the length of the substrate 12.

The portion of relatively wider width 18 has a zone 18Z of conductor which is substantially contiguous across the width of the portion 18, being substantially symmetrical at at least one point or distance along and with respect to the axis X of the substrate. In other words, there is a zone 18Z of conductor which is substantially contiguous and rectangular with edges thereof substantially parallel to the axis X. The portions of relatively wider width 18 in this example fill substantially the whole width of the substrate, perpendicular to the axis X. Each of the portions of relatively wider width 18 has a tapered region 20, at the end of the portion of relatively wider width 18 which is located more centrally along the length of the substrate 12—in other words the end of the respective portion 18 which is not substantially at the respective end of the substrate 12. The tapered regions 20 have a V or chevron shape boundary, with the vertices 22 of the tapered regions 20 being within the respective portion 18 so that the V or chevron shape "points" towards the centre of that portion 18. The vertices 22 are located on the axis X, and the portions of relatively wider width 18 is substantially symmetrical along the axis X. As in FIG. 1A, in the tapered region 20, perpendicular to the axis X the conductor decreases in coverage across the width of the portion of relatively wider width 18, in the direction of the axis X from the zone 18Z and the respective end of the portion 18. The tapered region 20 can be described as having two tapered elements, one on either side of the axis X. Each tapered element can be described as having a sub-axis XS (only one is labelled to aid clarity) along a line equidistant from each edge of the tapered region. Thus, as the tapered element of conductor encroaches into the region where it overlaps with the relatively narrower width portion on the other face of the substrate 12, it decreases in width. In this example the decrease is consistent, to form the "V" or chevron shape. In this example, the tapered element is also substantially symmetric along the sub-axis XS thereof.

The portion of relatively narrower width 16 extends between the two tapered regions 20.

FIGS. 1A and 1B show two faces of the same substrate 12 of the antenna 10. Each of the elements 14A, 14B are arranged so that the portions 16, 18 are approximately the same length as one another, and where present the portions of relatively narrower width 16 of one element on one face of the substrate 12 substantially correspond along the axis X of the substrate 12 with the portions of relatively wider width 18 of the other element on the other face portion of the substrate 12, so that the tapered regions 20 of the portions of relatively wider width 18 overlap along the axis X with at least one portion of relatively narrower width 16 of the other element.

In FIG. 1A, the portion of relatively wider width 18 is symmetrical with itself in a reflection line perpendicular to the axis X of the substrate 12 at a mid-point M of the portion of relatively wider width 18 along the axis X of the substrate 12.

Figure 2:
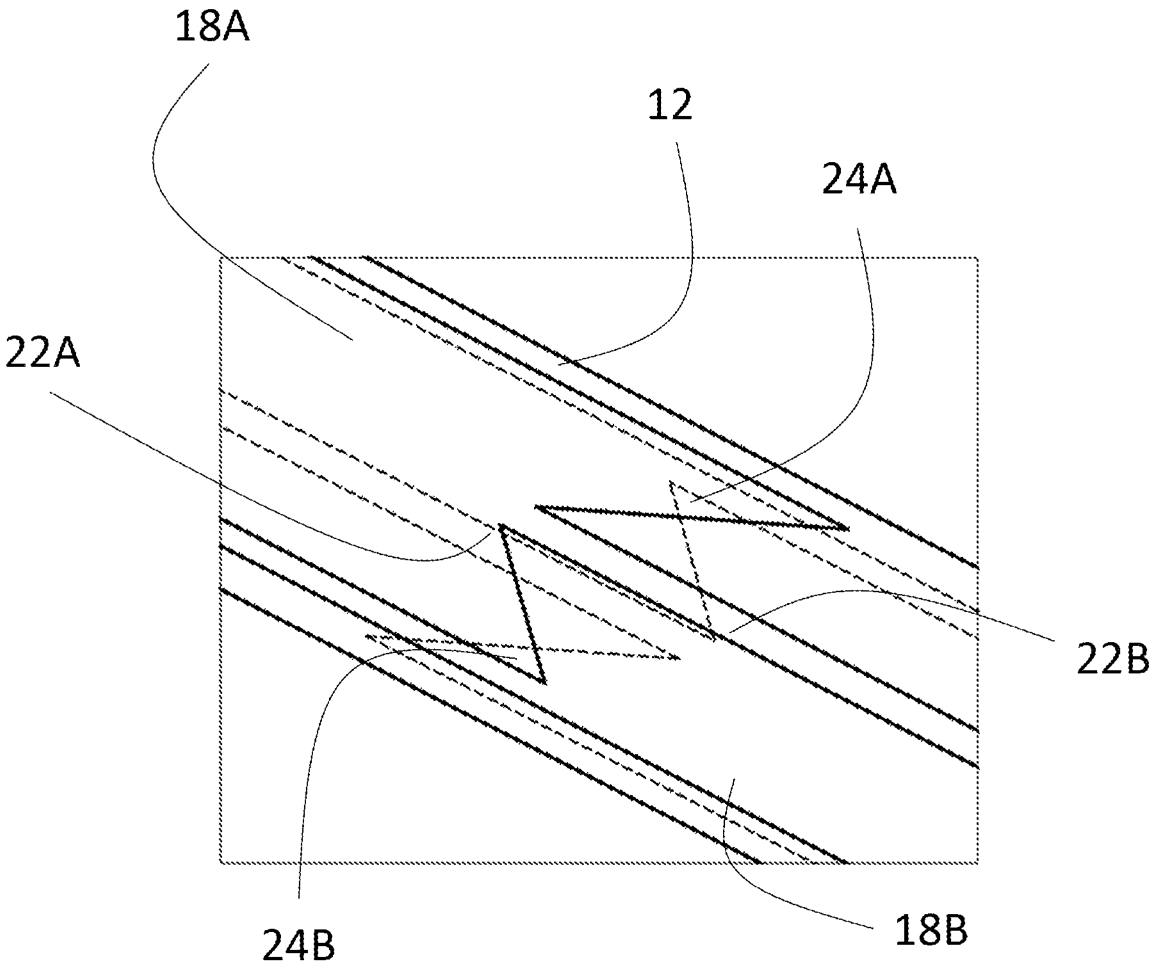
FIG. 2 shows a perspective schematic of a part of an exemplary embodiment, to show how portions of elements on either face can overlap.

FIG. 2 shows part of a similar arrangement as shown in FIG. 1, in a schematic way to show how portions of elements can overlap. The skilled reader will appreciate that certain features are not labelled to aid clarity. Substrate 12 has elements arranged on two faces thereof. A first portion of relatively wider width 18A is on a first face of the substrate 12, and a second portion of relatively wider width 18B is on the other, second, face of the substrate 12. The first portion of relatively wider width 18A has a tapered region with a vertex 22A. The second portion of relatively wider width 18B has a tapered region with a vertex 22B. The tapered regions of the portions 18 of relatively wider width overlap portions of relatively narrower width on the respective other face of the substrate 12. Thus in region 24A the first portion of wider width 18A encroaches into the space of a portion of relatively narrower width on the second face of the substrate 12 and in region 24B the second portion of relatively wider width 18B encroaches into the space of a portion of relatively narrower width on the first face of the substrate 12.

Figure 3:
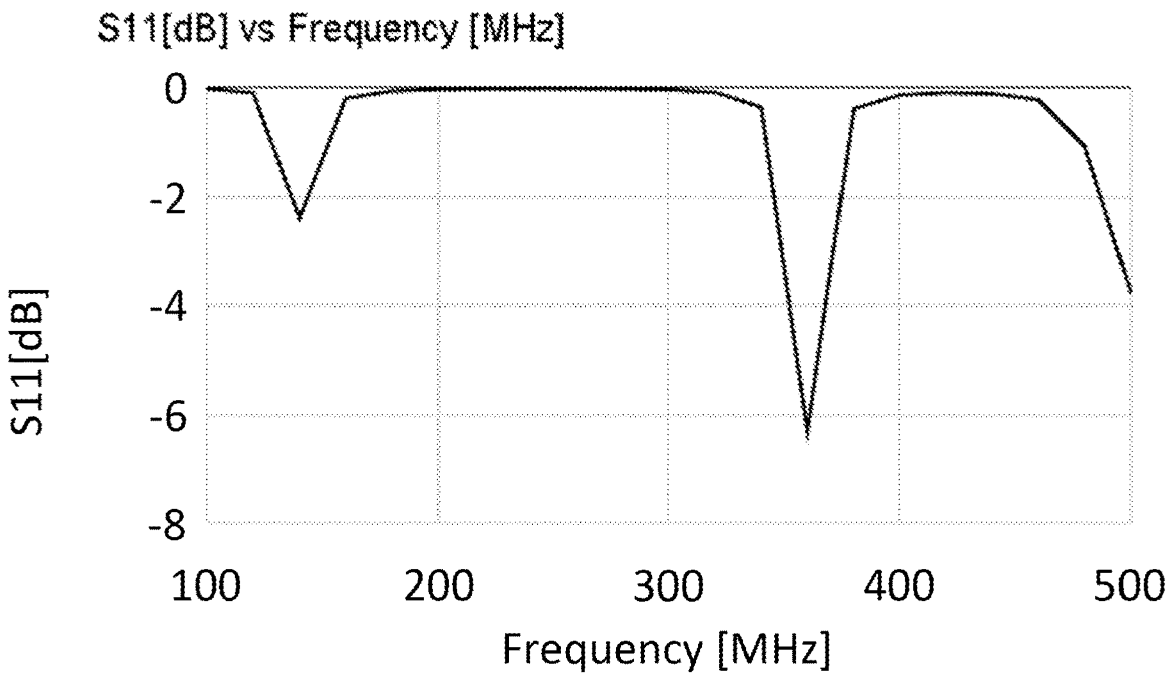
FIG. 3 shows a frequency response curve for an arrangement which has non-tapered element portions of relatively wider width which, it is important to note, do not fall within the scope of the present inventive concept.

FIG. 3 shows a frequency response curve for an arrangement which has non-tapered element portions of relatively wider width which, it is important to note, do not fall within the scope of the present inventive concept.

Figure 4:
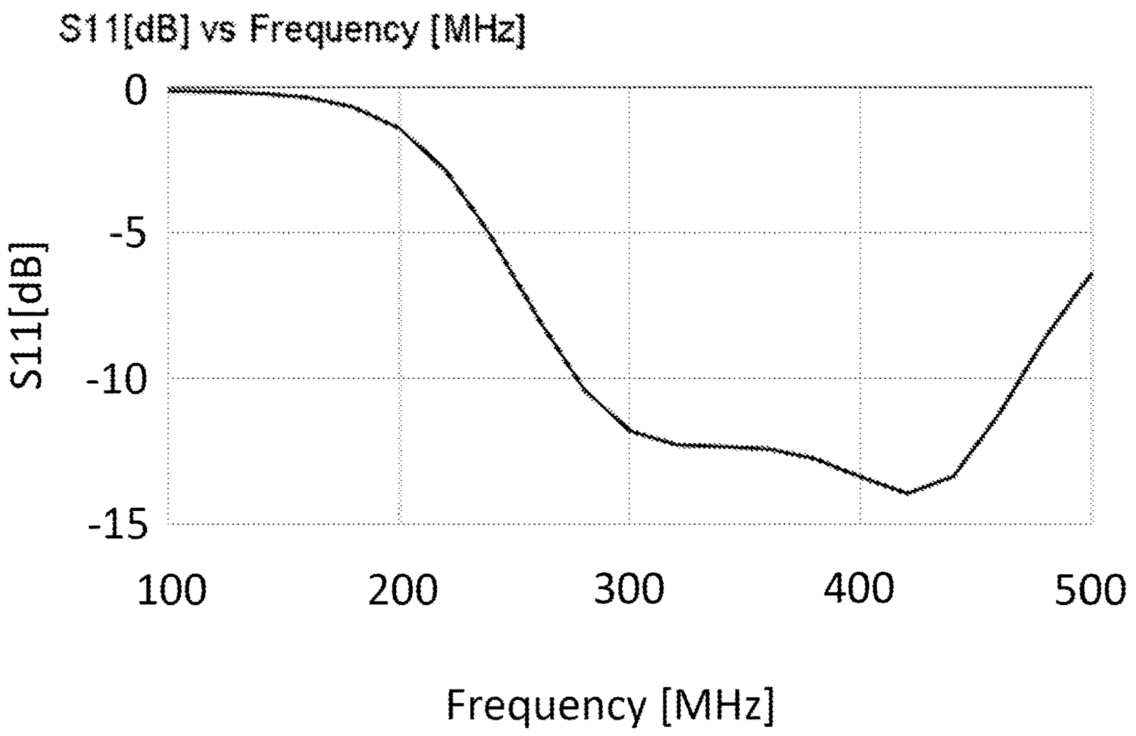
FIG. 4 shows a frequency response curve for an arrangement which exemplifies the present inventive concept, wherein the element portions of relatively wider width have tapered regions along the axis.

FIG. 4 shows a frequency response curve for an arrangement which exemplifies the present inventive concept, wherein the element portions of relatively wider width have tapered regions along the axis. All other material properties and dimensions are the same in the arrangements of FIGS. 3 and 4, save for the absence and presence of tapered regions, respectively. FIGS. 3 and 4 are intended to be considered relative to one another, with the frequency response in FIG. 4 being much stronger across a much wider range of frequencies. This demonstrates the effect of the tapered regions of the portions of element with relatively wider width.

Figure 5:
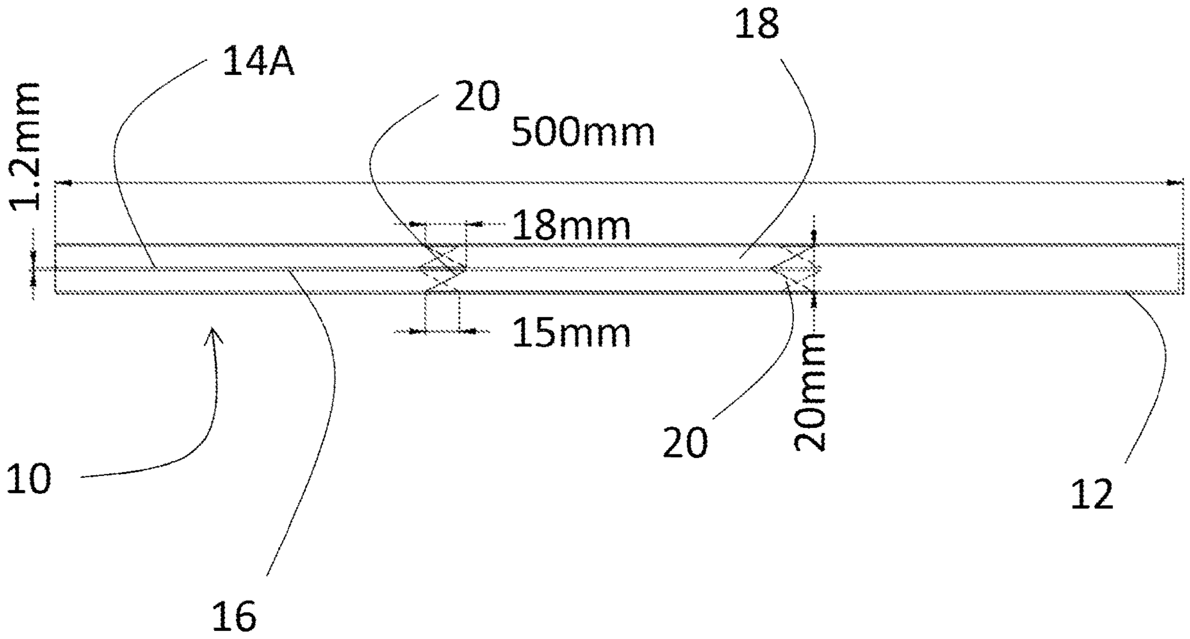
FIG. 5 shows a plan view of a further exemplary embodiment of an antenna of the present inventive concept.

FIG. 5 shows an antenna 10 having a substrate 12 of approximately 500 mm in length and approximately 0.6 mm in thickness. On the face shown of the substrate 12, an element 14A is arranged on the substrate 12 and has a portion 16 of relatively narrower width located at substantially one end of the substrate 12 (where the antenna would be driven or fed) and a portion 18 of relatively wider width located substantially centrally along the length of the substrate 12 adjacent the portion 16 of relatively narrower width. The portions of relatively narrower width 16 and portion of relatively wider width 18 thus alternate along the axis and along the length of the substrate 12. The portion of relatively wider width 18 is approximately 20 mm wide. The portions of relatively narrower width 16 are approximately 1.2 mm wide. The portion of relatively wider width 18 has at each end tapered regions 20 which form a V or chevron shape in which the vertices of the V shapes are within the portion 18 so that the V or chevron shape "points" towards the centre of the portion 18. The tapered regions 20 are approximately 18 mm in length. Whilst the other face of the substrate 12 is not shown in FIG. 5, an indication of an overlap of the tapered regions 20 with corresponding tapered regions on portions on the other face is present in FIG. 5. The length of overlap in this embodiment is approximately 15 mm at either end of the region 20.

Figure 6:
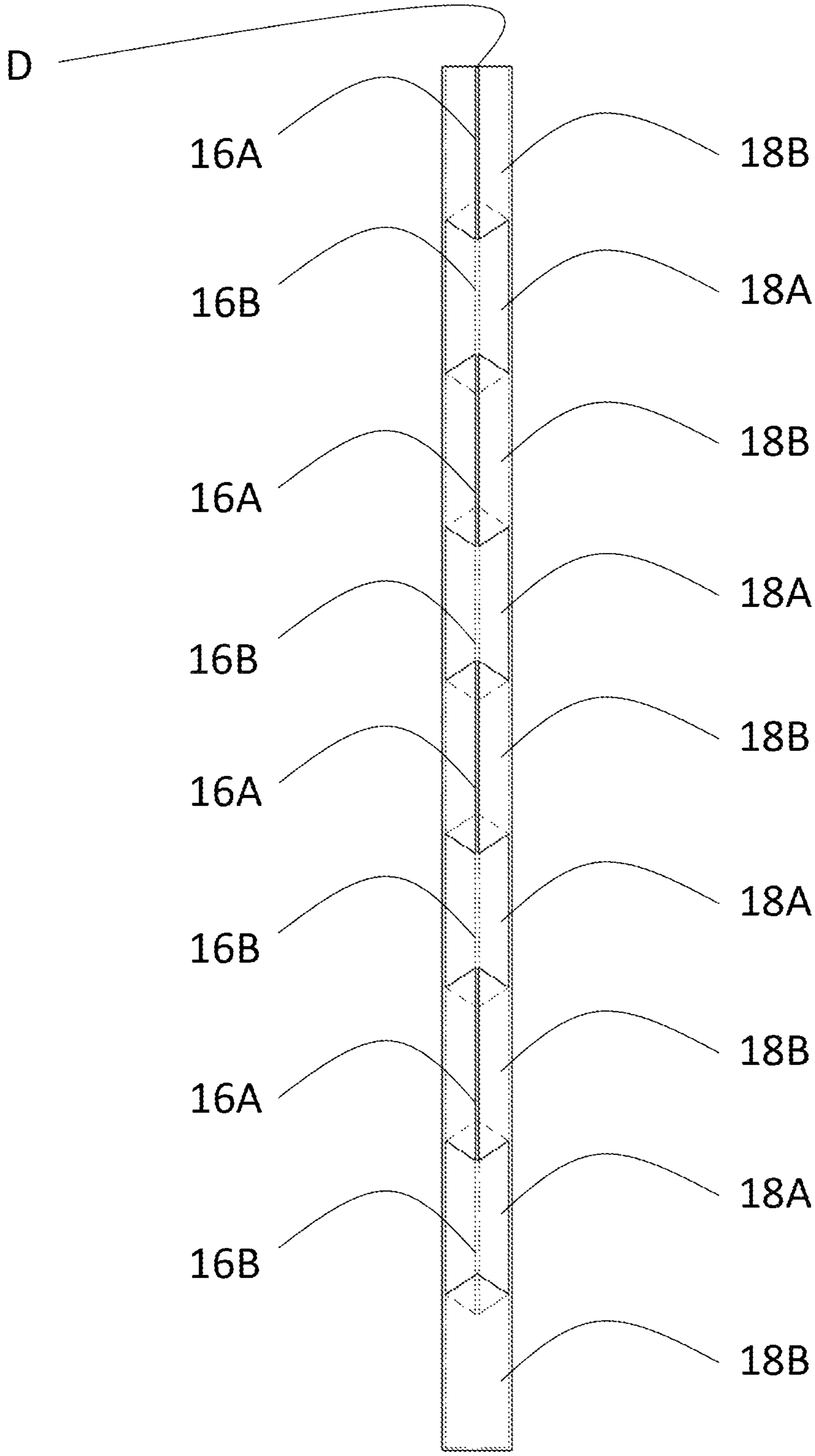
FIG. 6 shows a plan view of a further exemplary embodiment of an antenna of the present inventive concept.

FIG. 6 shows a plan view of a first face of an exemplary embodiment having four portions of relatively narrower width 16A and four portions of relatively wider width 18A on the first face of substrate, and four portions of relatively narrower width 16B and five portions of relatively wider width 18B on a second face of substrate (the portions 16B, 18B on the second face are shown as dashed lines to indicate that they are on the underside). The antenna would be driven/fed at end D. In FIG. 6, some of the portions of relatively wider width 18A, 18B are symmetrical across a mid point thereof.

Figure 7:
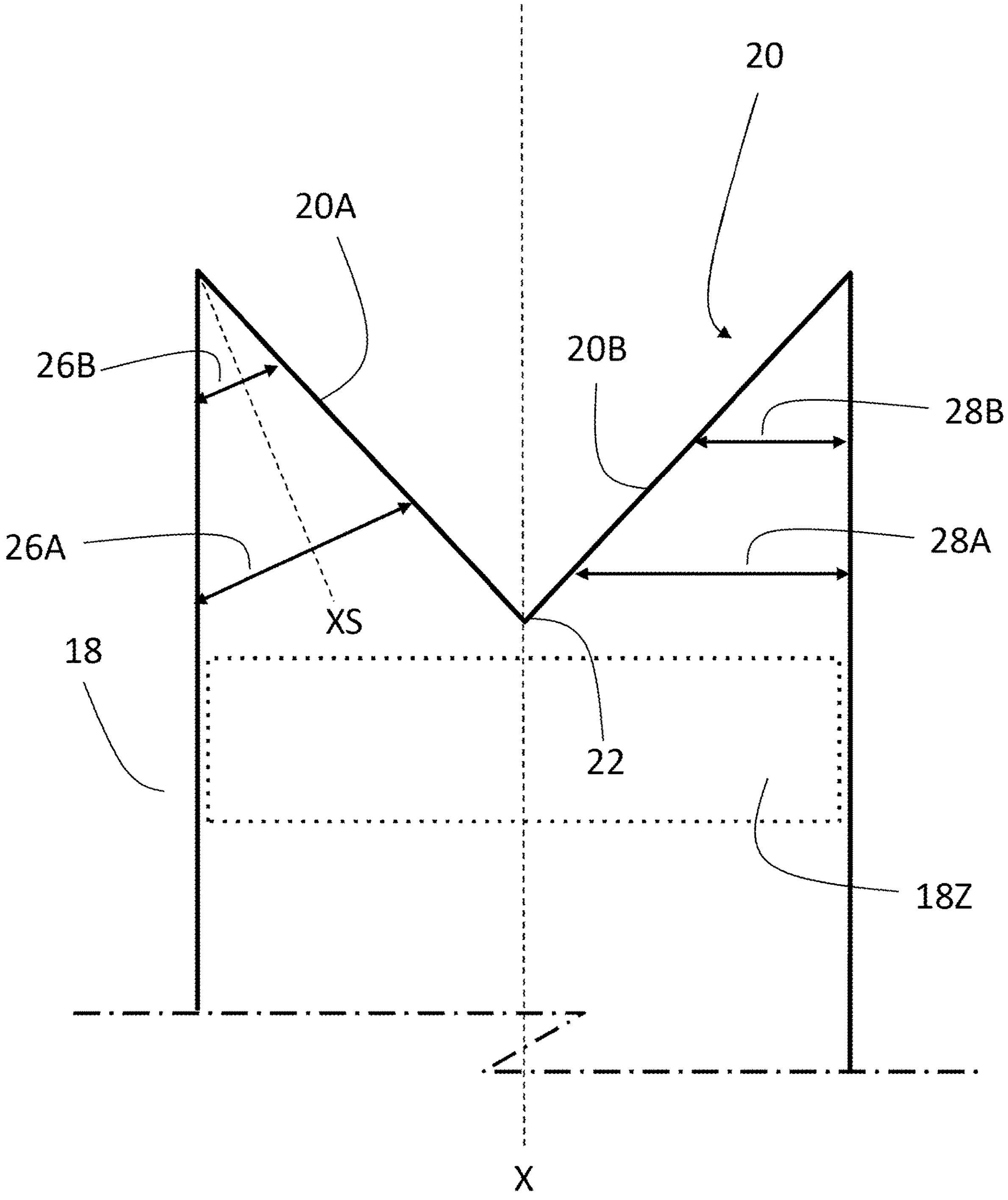
FIG. 7 shows an expanded view of part of a tapered region which would be part of a portion of wider width 18 of an antenna as described herein.

FIG. 7 shows an expanded view of part of a tapered region 20 which would be part of a portion of wider width 18 of an antenna as described herein. The rest of the portion of wider width 18 and the rest of the antenna (including the portion of narrower width which would extend from the tapered region 20) are not shown in FIG. 7. The dashed discontinuity line in FIG. 7 is used to show that only part of the portion of wider width 18 is shown here.

The portion of relatively wider width 18 has a zone 18Z of conductor which is substantially contiguous across the width of the portion 18, being substantially symmetrical at at least one point or distance along and with respect to the axis X of the substrate. In other words, there is a zone 18Z of conductor which is substantially contiguous and rectangular with edges thereof substantially parallel to the axis X.

In this example, at an end of the portion of relatively wider width 18 there is a tapered region 20 which has a V or chevron shape boundary, with the vertex 22 of the tapered region 20 being within the portion 18 so that the V or chevron shape "points" towards the centre of the portion 18 (the rest of which is not shown here) and the zone 18Z. The vertex 22 is located on the axis X, and the portion of relatively wider width 18 is substantially symmetrical along the axis X. The conductor decreases in coverage across the width of the portion of relatively wider width 18, along the axis X away from the zone 18Z and towards the respective end of the portion 18. The tapered region 20 can be described as having two tapered elements 20A, 20B, one on either side of the axis X. Each tapered element 20A, 20B can be described as having a sub-axis XS along a line equidistant from each edge of the respective tapered element—although in FIG. 7 only sub-axis XS is shown with respect to tapered element 20A.

As can be seen in FIG. 7, the width 26B of the tapered element 20A is smaller towards the respective end of the portion 18 than closer to the zone 18Z where the width 26A is larger. Likewise, the width 28B of the tapered element 20B is smaller towards the respective end of the portion 18 than close to the zone 18Z where the width 28A is larger.

Thus, as the tapered element of conductor encroaches into the region where it overlaps with the relatively narrower width portion on the other face of the substrate, it decreases in width. In this example the decrease is consistent, to form the "V" or chevron shape. In this example, the tapered element is also substantially symmetric along the sub-axis XS thereof.

Figure 8:
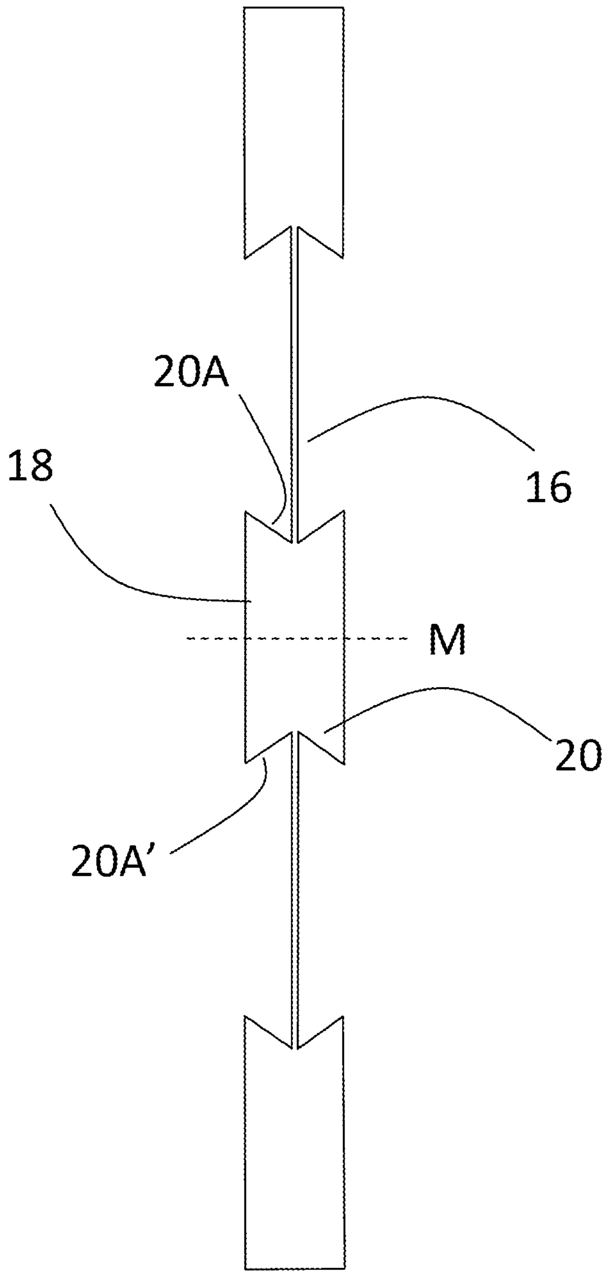
FIG. 8 shows part of a conductor which could form part of an antenna of the present inventive concept to show an arrangement with a portion of relatively wider width having reflective symmetry along a mid point.

FIG. 8 shows part of a conductor which could form part of an antenna of the present inventive concept. For ease of description and understanding of the drawing, only certain parts are shown and labelled. A portion of wider width 18 of the conductor has a tapered region 20 at either end, and portions of narrower width 16 extend from each end of the portion of wider width 18. A line M shows the midpoint of the portion of relatively wider width 18. The portion of relatively wider width 18 is reflectively symmetric across the line M; in other words the portion of relatively wider width is substantially identical about the line M. To further show this, identical tapered elements 20A and 20A' are labelled in FIG. 8. In this example, the conductor as a whole is also reflectively symmetric across the line M.

The invention claimed is:

1. A radiofrequency collinear microstrip patch antenna to be driven by an external source, the radiofrequency collinear microstrip patch antenna comprising:

an electrically insulating substrate being longer along an axis than its width substantially perpendicular to the axis, the substrate having at least two face portions in different geometric planes;

the radiofrequency collinear microstrip patch antenna further comprising at least one element of electrical conductor on each of the at least two face portions of the substrate along the axis of the substrate, each element comprising one or more portions of relatively narrower width and one or more portions of relatively wider width, each portion being approximately a same length as one another;

wherein at least one portion of relatively narrower width of a first element on one face portion of the substrate substantially corresponds along the axis of the substrate with at least one portion of relatively wider width of a second element on another face portion of the substrate;

wherein at least one portion of relatively wider width of the second element comprises a zone of conductor which is substantially contiguous across a width of the portion of relatively wider width and at least one tapered region along the axis, the tapered region overlapping along the axis of the substrate with the at least one portion of relatively narrower width of the first element;

wherein the at least one tapered region includes two tapers of the at least one portion of relatively wider width that forms an approximately concave end to the portion of relatively wider width such that the at least one portion of relatively wider width is longer along the axis towards a side of the substrate than towards the axis of the substrate; and wherein the radiofrequency collinear microstrip patch antenna is adapted to be driven from one end thereof only.

2. The radiofrequency collinear microstrip patch antenna according to claim 1, wherein the zone of conductor is substantially symmetrical at at least one point along and with respect to the axis of the substrate.

3. The radiofrequency collinear microstrip patch antenna according to claim 1, wherein the zone of conductor is substantially contiguous and rectangular with edges thereof substantially parallel to the axis of the substrate.

4. The radiofrequency collinear microstrip patch antenna according to claim 1, wherein the portion of relatively wider width fills substantially a whole width of the substrate, perpendicular to the axis.

5. The radiofrequency collinear microstrip patch antenna according to claim 1, wherein a tapered region comprises a V or chevron shape.

6. The radiofrequency collinear microstrip patch antenna according to claim 5, wherein a V or chevron shape is located at substantially one or both ends of the portion of conductor and is arranged so that a vertex thereof is within the portion and located substantially on the axis of the substrate.

7. The radiofrequency collinear microstrip patch antenna according to claim 5, wherein all of the tapered regions comprise a V or chevron shape.

8. The radiofrequency collinear microstrip patch antenna according to claim 1, wherein an element on at least one face portion has an odd number of portions.

9. The radiofrequency collinear microstrip patch antenna according to claim 8, wherein the element on at least one face portion has 3, 5, 7 or 9 portions.

10. The radiofrequency collinear microstrip patch antenna according to claim 1, wherein the radiofrequency collinear microstrip patch antenna has two face portions and the first element is on a first face portion and has one portion of relatively narrower width and one portion of relatively wider width and the second element is on a second face portion that has two portions of relatively wider width and one portion of relatively narrower width.

* * * * *